(12) United States Patent
Zellermayer et al.

(10) Patent No.: US 9,747,119 B2
(45) Date of Patent: Aug. 29, 2017

(54) METHODS AND APPARATUS TO MONITOR VIRTUAL COMPUTING ENVIRONMENTS

(71) Applicant: VMware, Inc., Palo Alto, CA (US)

(72) Inventors: Gal Zellermayer, Ramat Hasharon (IL); Hanan Aharonof, Herzliya (IL); Hilik Paz, Ramat Gan (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/748,213

(22) Filed: Jun. 23, 2015

(65) Prior Publication Data

US 2016/0378517 A1    Dec. 29, 2016

(51) Int. Cl.
*G06F 9/46* (2006.01)
*G06F 9/455* (2006.01)
*G06F 11/34* (2006.01)

(52) U.S. Cl.
CPC ........ *G06F 9/45533* (2013.01); *G06F 9/4555* (2013.01); *G06F 9/45558* (2013.01); *G06F 11/34* (2013.01); *G06F 2009/45595* (2013.01)

(58) Field of Classification Search
CPC ...... G06F 9/50; G06F 9/45533; G06F 9/4555; G06F 9/45558; G06F 2009/45595
See application file for complete search history.

(56) References Cited

U.S. PATENT DOCUMENTS

| | | | | |
|---|---|---|---|---|
| 9,122,562 | B1* | 9/2015 | Stickle | G06F 8/71 |
| 9,256,467 | B1* | 2/2016 | Singh | G06F 9/5055 |
| 2007/0074226 | A1* | 3/2007 | Zimmer | G06F 9/45537 719/321 |
| 2012/0159523 | A1* | 6/2012 | Kulkarni | G06F 9/5061 719/328 |
| 2012/0331478 | A1* | 12/2012 | Zhu | H04W 72/0486 718/104 |
| 2015/0154057 | A1* | 6/2015 | McGrath | G06F 9/45533 718/1 |
| 2016/0162320 | A1* | 6/2016 | Singh | G06F 9/5055 718/1 |

OTHER PUBLICATIONS

Graeme Johnson, "Docker at Shopify: How we built containers that power over 100,000 online shops", retrieved Mar. 23, 2015, http://www.shopify.com/technology/15934308-docket-at-shopify-how-we-built-containers-that-power-over-100-000-online-shops#disqus_thread), Nov. 18, 2014, 12 pages.
Oracle, "9.5 Monitoring and Shutting Down Containers", retrieved Mar. 23, 2015, http://docs.oracle.com/cd/E37670_01/E37355/html/ol/shutdown_contain . . . , 3 pages.
Jerome Petazzoni, "Why You Don't Need to Run SSHD in Your Docker Containers", Docker Blog, retrieved Mar. 23, 2015, http://blog.docker.com/2014/06/why-you-dont-need-to-run-sshd-in-docker/ . . . , Jun. 26, 2014, 27 pages.

* cited by examiner

*Primary Examiner* — Camquy Truong

(57) ABSTRACT

Methods, apparatus, systems and articles of manufacture to monitor virtual computing environments are described. An example method includes determining a computing resource status of a computing host that is operating a container engine, comparing the computing resource status to a threshold, and in response to determining that computing resource status does not exceed the threshold, executing a monitoring operation in a container hosted by the container engine.

19 Claims, 10 Drawing Sheets

METHODS AND APPARATUS TO MONITOR VIRTUAL COMPUTING ENVIRONMENTS

FIELD OF THE DISCLOSURE

This disclosure relates generally to virtual computing environments, and, more particularly, to methods and apparatus to monitor virtual computing environments.

BACKGROUND

Physical computing environments include physical computing resources such as servers, storage devices, etc. Physical computing resources may be expensive to maintain and/or may require specialized knowledge to operate and/or service. Virtual computing environments (sometimes referred to as "virtual data centers") virtualize such physical resources or physical components making it possible for someone who does not actually own the physical computing resources (e.g., servers, storage components and networks) to utilize the physical computing resources through commercial transactions. Virtualizing aggregates and presents various physical resources as virtual resources in a virtual computing environment. Additionally or alternatively, virtualization allows for the segregation of workloads executing on the same hardware or same pool of hardware resources. A workload, as used herein, is an abstraction of work that an application instance or a set of applications instances are to perform. For example, a workload may be implementing a web server, a payment processing server, implementing a web server farm, implementing a multilayer application, etc. Thus, virtualization allows for a web server and a payment processing server executing on the same underlying hardware to be segregated, have access to separate virtual hardware, etc.

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have access to the underlying hardware resources. In a typical full virtualization, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or access to the hardware resources of the underlying server. Additionally, in full virtualization, a full guest operating system is typically installed in the virtual machine while a host operating system is installed on the server hardware. Example virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed to access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Container virtualization, also referred to herein as operating system virtualization, refers to a system in which processes are isolated in virtual containers in an operating system. In a typical container virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container (also referred to as a virtual container). Thus, a process executes within a container that isolates the process from other processes executing on the host operating system. Thus, container virtualization provides isolation and resource management capabilities without the resource overhead utilized by a full virtualization environment or a paravirtualization environment. Example operating system virtualization environments include Linux Containers LXC and LXD, Docker™, OpenVZ™, etc.

In some instances, it is desirable to monitor the operation of applications and/or other operations executing in a virtual environment (e.g., executing in a virtual machine, executing in a container, etc.). Typically, a monitoring agent is installed in each of the virtual environments to be monitored. FIG. 1 is a block diagram of a typical example system 100 in which containers in a virtual container environment are monitored.

The example system 100 includes a host computing device 102, a network 104, and a central server 106. In the example, system, monitoring data collected at the example host 102 is transmitted via the example network 104 to the example central server 106. While the example system 100 includes a single host 102, a single network 104, and a single central server 106, any number of the hosts 102, the networks 104, and the central servers 106 may be included. For example, a plurality of the hosts 102 may collect data that is transmitted to a central server 106 for analysis and reporting of the aggregated data.

According to the example FIG. 1, an example operating system 110 executes on the example host 102. The example operating system includes an example container engine 112.

For example, the operating system 110 and the container engine 112 may be implemented by a Linux containers infrastructure.

The illustrated example includes three example containers 114, which each include an example application 116 executing within the container 114. Additionally, a monitoring agent 118 is installed in each of the example containers 114. The example monitoring agents 118 collect monitoring information about the execution of the example application 116 in the example containers 114. For example, the monitoring agents 118 may collect information about resource utilization of a process associated with the example application 116 in the containers 114 (e.g., processing resource utilization, memory resource utilization, disk resource utilization etc.). According to the illustrated example, the monitoring agents 118 transmit the collected monitoring information to the example central server 106 via the example network 104. Accordingly, the central server 106 can analyze and report on the collected monitoring information.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
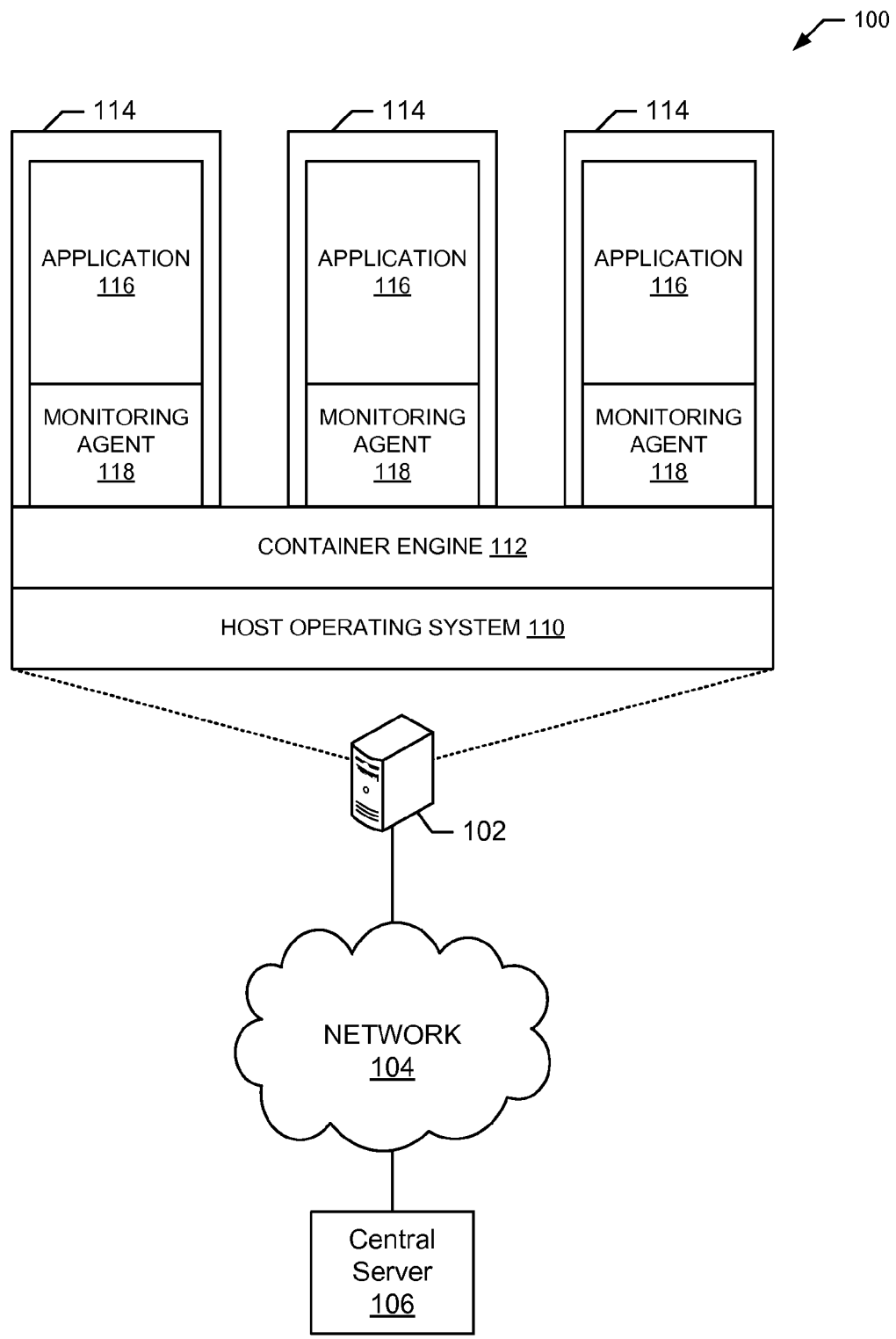
FIG. 1 is a block diagram of a typical example system in which containers in a virtual container environment are monitored.

Virtual computing environments that are monitored through the use of monitoring agents deployed in the virtual machines, containers, etc. (e.g., the example monitoring agents 118 deployed in the virtual containers 114 in FIG. 1) are capable of collecting monitoring information for the virtual environments at the expense of the computing resources utilized by the monitoring agents and the lack of coordination with the host computing device (e.g., the example host computing device 102). For example, if a virtual environment included fifty virtual containers operating on a host computing device and each virtual container was monitored by a monitoring agent that utilized x computing resources, the monitoring agents in total would consume 50x computing resources. Furthermore, because each monitoring agent is deployed in a separate virtual machine, separate container, etc. the monitoring agents cannot communicate with each other to coordinate operations.

Example methods and apparatus disclosed herein utilize a monitor that monitors virtual containers while the monitor is operating outside of the virtual containers, monitors virtual machines while the monitor is operating outside of the virtual machines, etc. (e.g., executing within an operating system executing in a virtual machine, executing on a host computing device, etc.) to remotely instruct the performance of monitoring operations virtual containers, within the virtual machines, etc. The example monitor may also be able capable of monitoring the status of the host computing device, the status of a virtual machine in which a container environment is executing, the operating system executing within a virtual machine or executing on the host computing device, and the components of the virtual computing environment (e.g., a container engine) to coordinate the monitoring operations. For example, the monitor may make decisions about when and/or if monitoring operations should be performed based on the resource availability of the host computing device (information that is not available to monitoring agents executing within a virtual container to be monitored and/or within a virtual machine to be monitored).

Figure 2A:
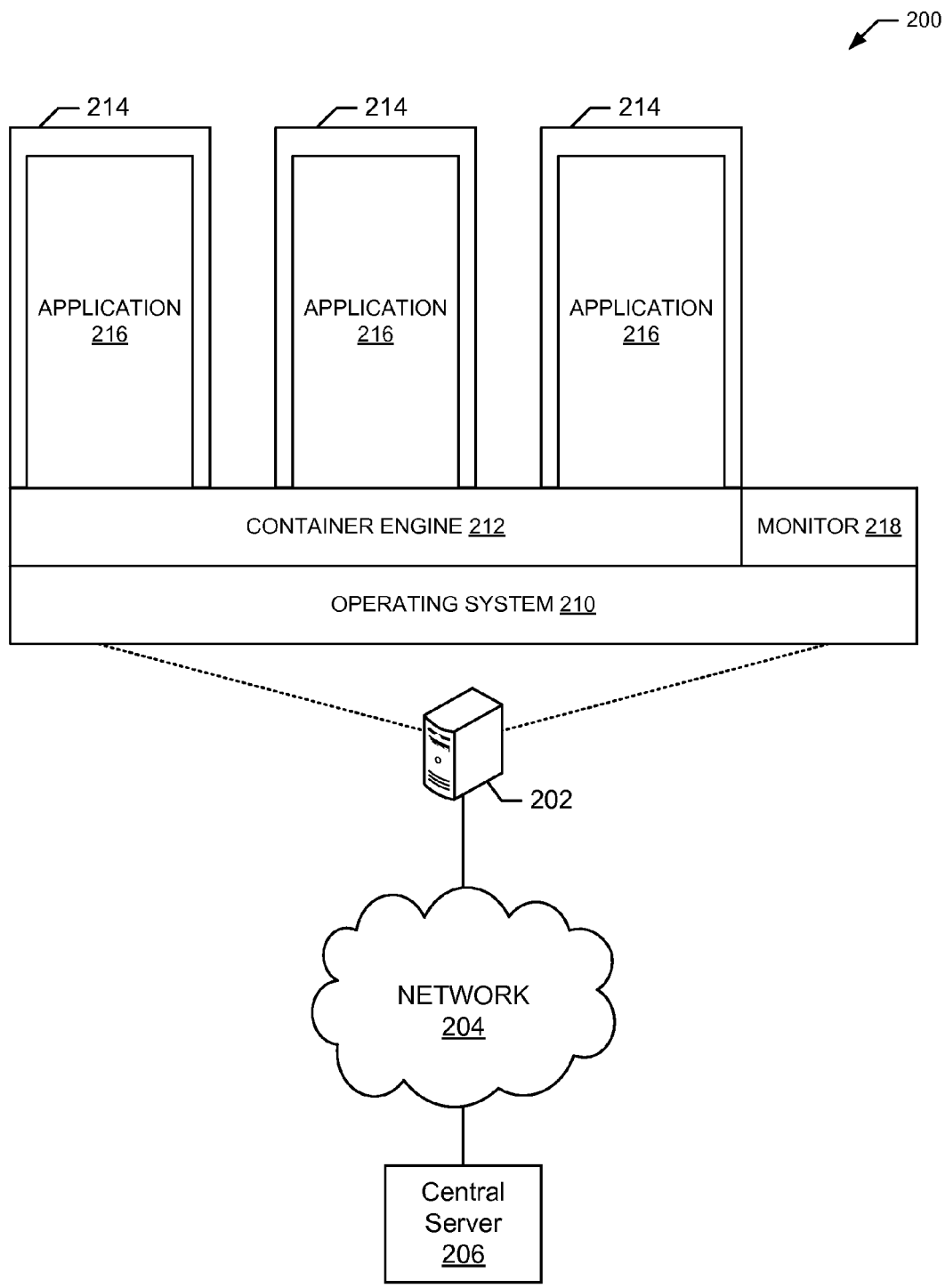
FIGS. 2A and 2B are block diagrams of an example environments constructed in accordance with the teachings of this disclosure to monitor virtual environments on a host computing device.

FIG. 2A is a block diagram of an example environment 200 constructed in accordance with the teachings of this disclosure to monitor virtual containers on a host computing device 202. The example environment includes the example host computing device 202, the example network 204, and the example central server 206.

The example host computing device 202 is a physical computing device that includes processing resources, memory resource, storage resources, network and connectivity for executing an example operating system 210, which includes an example container engine 212. The example host computing device 202 may be any type of computing device such as a server computer, a desktop computer, a portable computer, etc. An example processor platform 900 that may be utilized to implement the example host computing device 202 is described conjunction with FIG. 9.

The network 204 of the illustrated example communicatively couples the example host computing device 202 with the example central server 206. The example network 204 is a local area network. The network 204 may alternatively be any other type and number of network(s). For example, the network 204 may be implemented by several local area networks connected to a wide area network. The network 204 may comprise any combination of wired networks, wireless networks, wide area networks, local area networks, etc.

The central server 206 of the illustrated example is a server that receives monitoring data from the example host computing device 202. The example central server 206 analyzes the monitoring data and generates reports on the status of the host computing device 202. According to the illustrated example, the central server 206 is a standalone server that receives monitoring data from multiple host computing devices 202 via the network 204. Alternatively, the operations of the central server 206 could be performed by multiple devices. For example, each of the host computing devices 202 could implement a data collection service that collects monitoring information.

In operation of the illustrated example of FIG. 2A, a monitor 218 executing in the example operating system 210 on the host computing device 202 collects monitoring information from example containers 214 in which example applications 216 are executing. The example containers 214 are implemented by and controlled by the example container engine 212. The example monitor 218 transmits the collecting monitoring information to the example central server 206 via the example network 204.

The operating system 210 of the illustrated example may be any operating system in which the container engine 212 may be operated. For example, the operating system 210 may be an operating system that includes the container engine 212 or may be an operating system in which the container engine 212 may be installed.

The container engine 212 of the illustrated example provides the libraries, binaries, etc. utilized for implementing the example containers 214. For example, the example container engine 212 provisions namespaces within the example operating system 210 to generate the example containers 214 such that the applications 216 executing within the containers are isolated from each other (e.g., a first one of the containers 214 ensures that a first one of the applications 216 executing within the first one of the containers 214 is isolated from a one of the applications 216 that is executing within a second one of the containers 214). Alternatively, any other operations for creating the containers 214 may be utilized.

The applications 216 may be any type of application that can be executed within the example containers 214. For example, the applications 216 may be an application that is executable within the example operating system 210. While each of the containers 214 of the illustrated example includes a single one of the applications 216, the containers 214 may alternatively execute multiple applications. The illustrated applications 216 may be the same applications or may be different applications. For example, some applications cannot be executed in an environment with another instance of that application. Thus, multiple instances of such an application can be executed by utilizing containers that isolate the instances of the application such that one instance of the application is unaware of another instance of the application.

The example monitor 218 of the illustrated example executes within the operating system 210 to monitor the operation of the example applications 216 within the example containers 214. According to the illustrated example, the monitor 218 communicates with the container engine 212 to instruct the performance of monitoring operations within the example containers 214 and to receive the results of those monitoring operations. The example container engine 212 transmits the collected monitoring information to the example central server 206 via the example network 204.

To manage the performance of monitoring operations within the example containers 214, the example monitor 218 monitors the status of the example host computing device 202 and/or the example operating system 210. For example, the monitor 218 may determine whether the host computing device 202 has sufficient computing resource availability for a monitoring operation to be performed in each of the containers 214. In such an example, when sufficient computing resources are not available at the host computing device 202, the monitor 218 may skip or delay the monitoring operation.

Flowcharts representative of example machine readable instructions that may be executed to implement the example monitor 218 are described in conjunction with FIGS. 4-8.

Figure 2B:
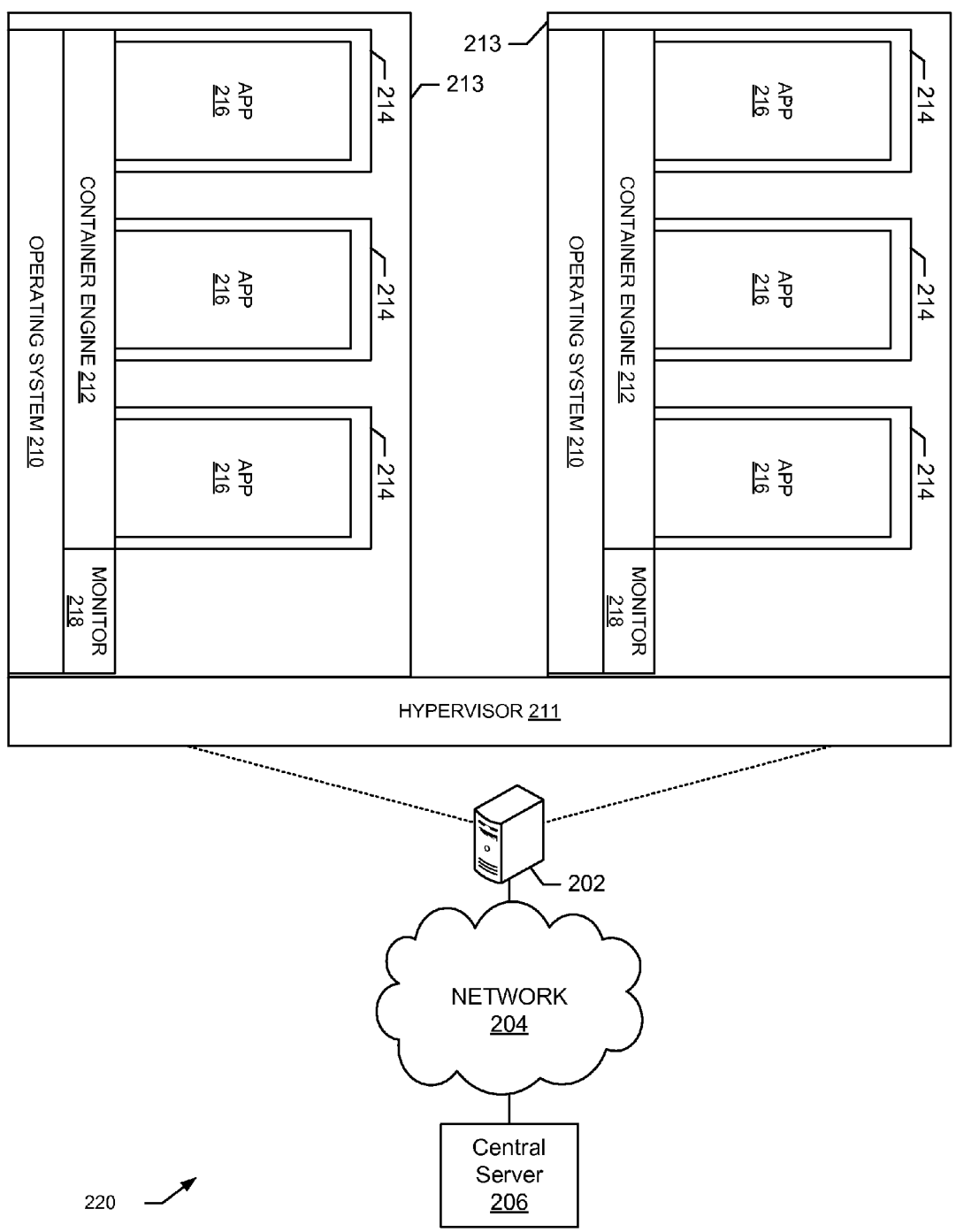

FIG. 2B is a block diagram of another example implementation of a virtualization environment in which the disclosed methods and apparatus for monitoring a virtual computing environment may be employed. In the example of FIG. 2B, the example operating system 210 is executed within a virtual machine 213 hosted by an example hypervisor 211 that is executing on the example host computing device 202 rather than the operating system 210 executing natively on the example host computing device 202 as in FIG. 2A. Thus, according to the illustrated example of FIG. 2B, two virtual machines, each executing an instance of the example operating system 210 are hosted by the example hypervisor 211. Alternatively, any number of the virtual machines 213 and the containers 214 may be employed.

According to the illustrated example, each of the example virtual machines 214 includes an instance of the example monitor 218. To control monitoring operations executed within the example containers 214, the example monitor 218 may monitor the status of the example operating system 210, the example virtual machines 213, the example hypervisor 211, and/or the example host computing device 202.

Other than the use of the virtual machines 213 and the hypervisor 211, the example of FIGS. 2A and 2B are similar. Thus, the foregoing discussion of like numbered components in FIG. 2A applies equally well to the like numbered parts of FIG. 2B and, to avoid redundancy, FIG. 2B will not be separately described.

While two example environments are illustrated in FIGS. 2A and 2B other environments may be monitored by the example monitor 218 and/or a plurality of instances of the example monitor 218. For example, any type of hybrid environment (e.g., combination of virtual machines, container hosting operating systems, native operating systems, etc.) may be monitored. In addition, the environments may include a single instead of the monitor 218 executing natively on the computing device 202, a single instead of the monitor 218 executing natively on the computing device 202 and another instance of the example monitor 218 executing within one or more of the virtual machines 213, instances of the example monitor 218 executing within one or more of the virtual machines 213 without an instance of the monitor 218 executing natively on the computing device 202, etc. While the example monitor 218 is described as controlling monitoring operations to be performed within the example containers 214 while the monitor 218 is executing outside of the example containers 214, the monitor 218 may control monitoring operations to be performed within any other type of object (e.g., a virtual machine) while the example monitor 218 is executing outside of that object.

Figure 3:
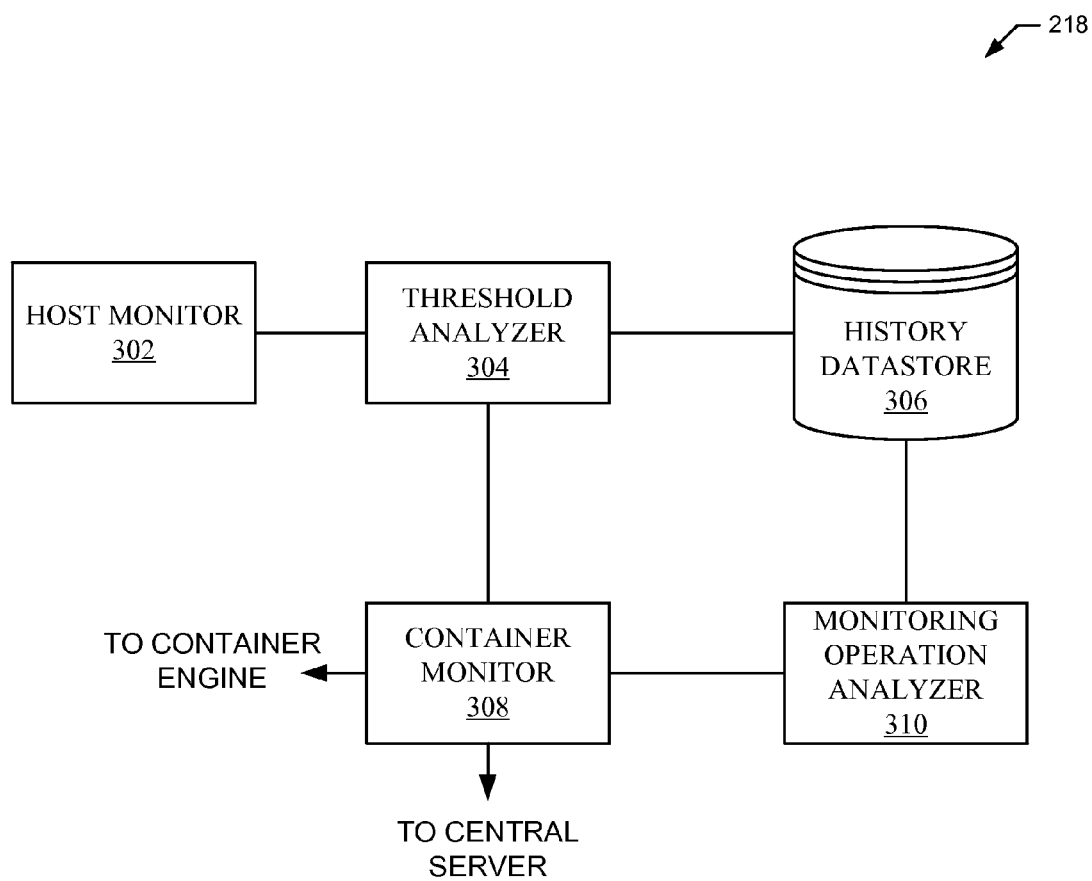
FIG. 3 is a block diagram of an example implementation of the monitor of FIG. 2A and/or FIG. 2B constructed in accordance with the teachings of this disclosure.

FIG. 3 is a block diagram of an implementation of monitor 218 of FIG. 2. The example monitor 218 of FIG. 3 includes an example host monitor 302, an example threshold analyzer 304, an example history datastore 306, an example container monitor 308, and an example monitoring operation analyzer 310.

The example host monitor 302 of the illustrated example monitors the status of a host for a virtual computing environment to collect status information to be used by the example threshold analyzer 304 in determining whether monitoring operations will be performed. The example host monitor 302 transmits the collected monitoring information to the example threshold analyzer 304.

According to the illustrated example, the host monitor 302 monitors the status of computing resources provided by the host computing device 202. For example, the host monitor 302 may monitor the total processing resources (e.g., central processing unit (CPU) processing cycles), the currently available processing resources, the total memory, the currently available memory, the total disk space, the currently available disk space, the total network bandwidth, the currently available network bandwidth, etc. The host monitor 302 may monitor any resources or components of the host computing device 202. For example, the host monitor 302 may monitor the status of the example operating system 210 and/or the example container engine 212.

Alternatively, the example host monitor may monitor the status of the example virtual machines 213 of FIG. 2B. Throughout this disclosure, whenever reference is made to monitoring the status of the host computing device 202, the disclosure includes monitoring any hosting resource (e.g., the example container engine 212 of FIG. 2A, the example operating system 210 of FIG. 2A, the example host computing device 202 of FIG. 2A, the example container engine 212 of FIG. 2B, the example operating system 210 of FIG. 2B, the example virtual machine 213 of FIG. 2B, the example host computing device 202 of FIG. 2B, etc.). To avoid redundancy, the list of resources that may be analyzed by the example monitor 218 and/or the example host monitor 302 are not repeated in each discussion of resource monitoring.

The threshold analyzer 304 of the illustrated example compares host status information collected by the example host monitor 302 to threshold(s) to determine if the example container monitor 308 should initiate monitoring operations in the example virtual containers 214. The threshold analyzer 304 of the illustrated example retrieves the threshold(s) from the example history datastore 306. In some examples, the threshold(s) are values specified by a user (e.g., an administrator) of the example monitor 218. Additionally or alternatively, the threshold(s) may be set and/or adjusted by the example monitoring operation analyzer 310 as described in further detail below. The threshold(s) may be any type of threshold (e.g., an upper threshold, a lower threshold, etc.) and/or may be derived from a model set of thresholds rather than a particular set threshold(s). According to the illustrated example, when the host status information is within the threshold (e.g., below an upper threshold, above a lower threshold etc.), which is a prediction that the host computing device 202 will have sufficient computing resources for performing the monitoring operations, the example threshold analyzer 304 notifies the example container monitor 308 that monitoring operations may be performed. In some examples, the threshold analyzer 304 may include more than one threshold for a particular parameter in the host status information collected for the host computing device 202. For example, if the status information meets a first threshold a first monitoring operation may be instructed by the example threshold analyzer 304 while if the status information meets a second threshold a second monitoring operation (or the first and second) may be instructed. For example, monitoring operations may include different computing resource costs and, thus, different monitoring operations may be selected based on the status information collected by the host monitor 302.

The example history datastore 306 is a datastore that threshold information and/or information about the execution of monitoring operations. According to the illustrated example, the history datastore 306 stores threshold information input by a user and/or stores threshold information determined and/or modified by the example monitoring operation analyzer 310, etc. Additionally, the example history datastore 306 stores information about the computing resources (e.g., the computing resource cost) of performing the monitoring operations in the example containers 214. For example, the history datastore 306 may store an amount of CPU cycles consumed by the operation of a monitoring operation in one of the example containers 214, may store a total cost of performing the monitoring operation in all of the example containers 214 that are to be monitored, etc. The history datastore 306 of FIG. 3 may be any type of storage such as a database, a file, a hard drive, a folder of data, etc.

The container monitor 308 of the illustrated example communicates with the example container engine 212 to instruct the performance of monitoring operations within the example containers 214. Additionally, the example container monitor 308 receives the results of performing the monitoring operations and transmits the monitoring results to the example central server 206. The example container monitor 308 is coupled with the threshold analyzer 304 to receive instructions on when it is acceptable to perform monitoring operations (e.g., when a host computing environment (e.g., the host computing device 202) is not overburdened (e.g., has sufficient computing resources to perform the monitoring operations)). The example container monitor 308 is additionally receptive to requests from the example monitoring operation analyzer 310 to monitor the operation of the monitoring operations to determine computing resources utilized by the example monitoring operations. The example container monitor 308 additionally provides information about the monitoring operations to the example monitoring operation analyzer 310.

The monitoring operation analyzer 310 of the illustrated example monitors the execution of monitoring operations (e.g., via the example container monitor 308) to collect information about the monitoring operations. For example, the monitoring operation analyzer 310 may instruct the container monitor 308 to determine an amount of free memory available at the host computing device 202 prior to performance of a monitoring operation and may, then, instruct the example container monitor 308 to determine an amount of free memory available during execution of the monitoring operation. By comparing the amount of free memory prior to execution of the monitoring operation with the amount of free memory available during the execution of the monitoring operation, the example monitoring operation analyzer 310 is able to determine the amount of memory (or, similarly, any other parameter in the host status information). The example monitoring operation analyzer 310 stores, in the example history datastore 306, determined threshold(s), determined computing resource costs of the execution of the monitoring operation, etc.

In operation of the example monitor 218 of FIG. 3, when it is time to perform a monitoring operation (e.g., after an amount of time since a last monitoring operation has elapsed, after a request from a user, etc.), the host monitor 302 determines host status information for the example host computing device 202 and passes the information to the example threshold analyzer 304. The example threshold analyzer 304 determines if the host status information exceeds a threshold retrieved from the example history datastore 306. For example, the threshold analyzer 304 may determine if the amount of used memory exceeds a minimum threshold, may determine if an amount of available (unused) memory is below a maximum threshold, etc. When the example threshold analyzer 304 determines that the host status information exceeds the threshold (e.g., sufficient computing resources are not available), the example threshold analyzer 304 instructs the example container monitor 308 not to perform the monitoring operation (e.g., to skip the monitoring operation and/or to delay execution of the monitoring operation). When the example threshold analyzer 304 determines that the host status information does not exceed the threshold (e.g., sufficient computing resources are available), the example threshold analyzer 304 instructs the example container monitor 308 to perform the monitoring operation. The example monitoring operation analyzer 310 may monitor the performance of the monitoring operation to set and/or adjust threshold(s) and/or model(s) stored in the example history datastore 306. For example, the monitoring operation analyzer 310 may monitor a single execution of a monitoring operation in one of the containers 214, may monitor the execution of the monitoring operation on multiple ones of the example containers 214 and combine (e.g., average the results), may monitor multiple executions of the monitoring operation on one or more of the containers 214 over a period of time (e.g., a sliding window) and combine (e.g., average the results), etc.

While an example manner of implementing the monitor 218 is illustrated in FIG. 3, one or more of the elements, processes and/or devices illustrated in FIG. 3 may be combined, divided, re-arranged, omitted, eliminated and/or implemented in any other way. Further, the example host monitor 302, the example threshold analyzer 304, the example container monitor 308, the example monitoring operation analyzer 310 and/or, more generally, the example monitor 218 of FIG. 2A and/or FIG. 2B may be implemented by hardware, software, firmware and/or any combination of hardware, software and/or firmware. Thus, for example, any of the example host monitor 302, the example threshold analyzer 304, the example container monitor 308, the example monitoring operation analyzer 310 and/or, more generally, the example monitor 218 of FIG. 2A and/or FIG. 2B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, host monitor 302, the example threshold analyzer 304, the example container monitor 308, and/or the example monitoring operation analyzer 310 is/are hereby expressly defined to include a tangible computer readable storage device or storage disk such as a memory, a digital versatile disk (DVD), a compact disk (CD), a Blu-ray disk, etc. storing the software and/or firmware. Further still, the example monitor 218 of FIG. 2A and/or FIG. 2B may include one or more elements, processes and/or devices in addition to, or instead of, those illustrated in FIG. 3, and/or may include more than one of any or all of the illustrated elements, processes and devices.

Flowchart representative of example machine readable instructions for implementing the monitor 218 are shown in FIGS. 4-8. In these examples, the machine readable instructions comprise program(s) for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 4, many other methods of implementing the example monitor 218 may alternatively be used. For example, the order of execution of the blocks may be changed, and/or some of the blocks described may be changed, eliminated, or combined.

As mentioned above, the example processes of FIGS. 4-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
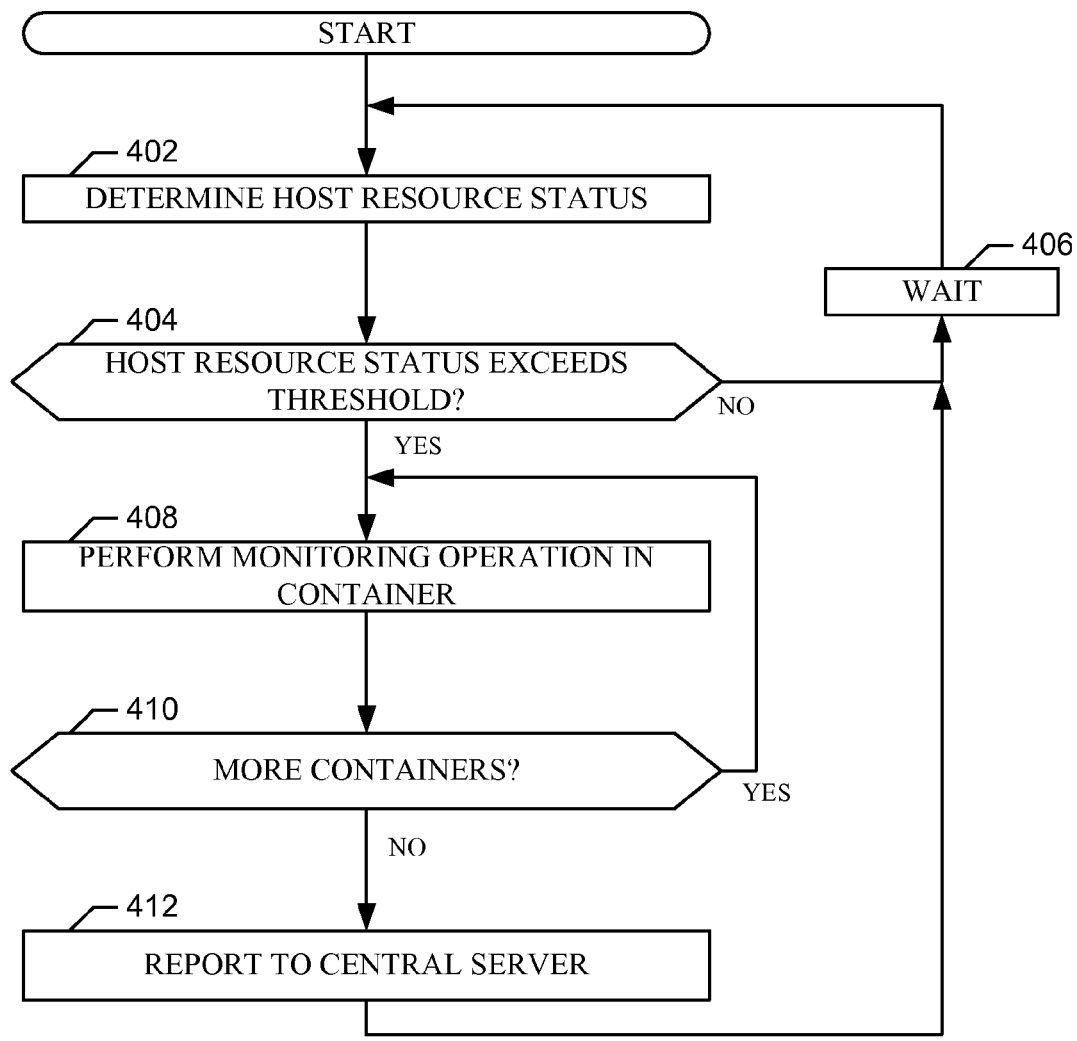
FIGS. 4-8 are a flowcharts representative of example machine readable instructions that may be executed to implement the example monitor of FIG. 2A, and/or FIG. 2B to monitor virtual containers on a host computing device.

The program of FIG. 4 begins when the example host monitor 302 of the example monitor 218 is alerted that a monitoring operation is to be performed on the example containers 214. For example, the program of FIG. 4 may begin after a time has elapsed since the last monitoring operation has executed, when a user input signals that a monitoring operation is to be performed, in response to detecting an error or a warning condition, etc. When a monitoring operation is to be performed, the example host monitor 302 determines the status of computing resources of the example host computing device 202 (block 402). The status may include any parameters, conditions, and/or other information that may be utilized by the example threshold analyzer 304 to determine if the monitoring operation can, should, and/or will be performed.

Utilizing the status information collected by the example host monitor 302 (block 402), the example threshold analyzer 304 determines if the status information indicates that the host resources exceed a threshold (block 404). The threshold may be retrieved from the example history datastore 306, may be stored at the threshold analyzer 304, and/or may be retrieved from any other location. While the example of FIG. 4 refers to determining if the resources exceed a threshold, the threshold analyzer 304 may determine if a resource meets a threshold, if a resource is below the threshold, etc. For example, if the status information indicates an amount of free resources (e.g., free/unused memory), the threshold may be a minimum amount of free resource that will be needed to perform the monitoring operation. In such an example, the threshold analyzer 304 will determine if the amount of free memory exceeds the threshold (e.g., that there is sufficient free memory to perform the monitoring operation). In another example, if the status information indicates an amount of a resource that is in use (e.g., an amount of used memory), the threshold may be a maximum amount of resource that can be in use and still allow sufficient free memory to perform the monitoring operation. In such an example, the threshold analyzer 304 will determine if the amount of used memory is below the threshold (e.g., that there is a sufficiently small amount of memory in use to allow sufficient free memory for performing the monitoring operation). In other words, the choice of which resource to monitor and how the data about the resource is collected will affect what type of threshold is utilized and how that threshold is compared with the resource. In the illustrated example, the decision block 404 is satisfied when the information about the resource indicates that there is a sufficient amount of available resource for performing the monitoring operation.

When the example threshold analyzer 304 determines that there is not sufficient resources available for performing the monitoring operation (block 404), the threshold analyzer 304 instructs the example container monitor 308 to delay performance of the monitoring operation (block 406). For example, the threshold analyzer 304 and/or the container monitor 308 may start a delay timer, may skip a round of execution of the monitoring operation and await an existing timer to trigger the monitoring operation again, etc. According to the illustrated example, control then returns to block 402 for the example host monitor 302 to again check the status of the example host computing device 202.

When the example threshold analyzer 304 determines that there is sufficient resources available for performing the monitoring operation (block 404), the example container monitor 308 performs the example monitoring operation in the example containers 214 (block 408). For example, the container monitor 308 may transmit an instruction to the example container engine 212 to cause the monitoring operation to be performed in the example containers 214.

According to the illustrated example, the example container monitor 308 sends an instruction (or set of instructions) identifying one of the containers 214 that is to be monitored (e.g., may send an instruction identifying a name of each of the containers 214). In an example in which the container engine 212 operates the LXC container environment, the instruction may be formatted as "lxc-attach -n<container-name>-e -- <command>" where <container-name> is an identifier for a particular one of the containers 214 and <command> is a command that is to be executed within the identified one of the containers 214. For example, the command may be "ps -ef" which, when executed in the one of the containers 214, returns a listing of the processing executing within the container.

After the example container monitor 308 instructs the execution of the monitoring operation (block 408), the container monitor 308 determines if there are additional ones of the containers 214 to be monitored (block 410). If there are additional ones of the containers 214 to be monitored, control returns to block 408 for the example container monitor 308 to instruct the monitoring operation for the next one of the containers 214. If there are no additional ones of the containers 214 to be monitored, the example container monitor 308 transmits collected monitoring information to the example central server 206 (block 412). The program of FIG. 4 then ends.

While the example of FIG. 4 illustrates that a separate instruction is transmitted at block 408 for each of the containers 214 to be monitored, the example container monitor 308 may, alternatively, transmit a single instruction that causes the monitoring operation to be executed within all desired ones of the containers 214. For example, the instruction could identify a plurality of container identifiers and/or could indicate to the example container engine 212 that the instruction should be executed in all of the containers 214 hosted by the example container engine 212.

Figure 5:
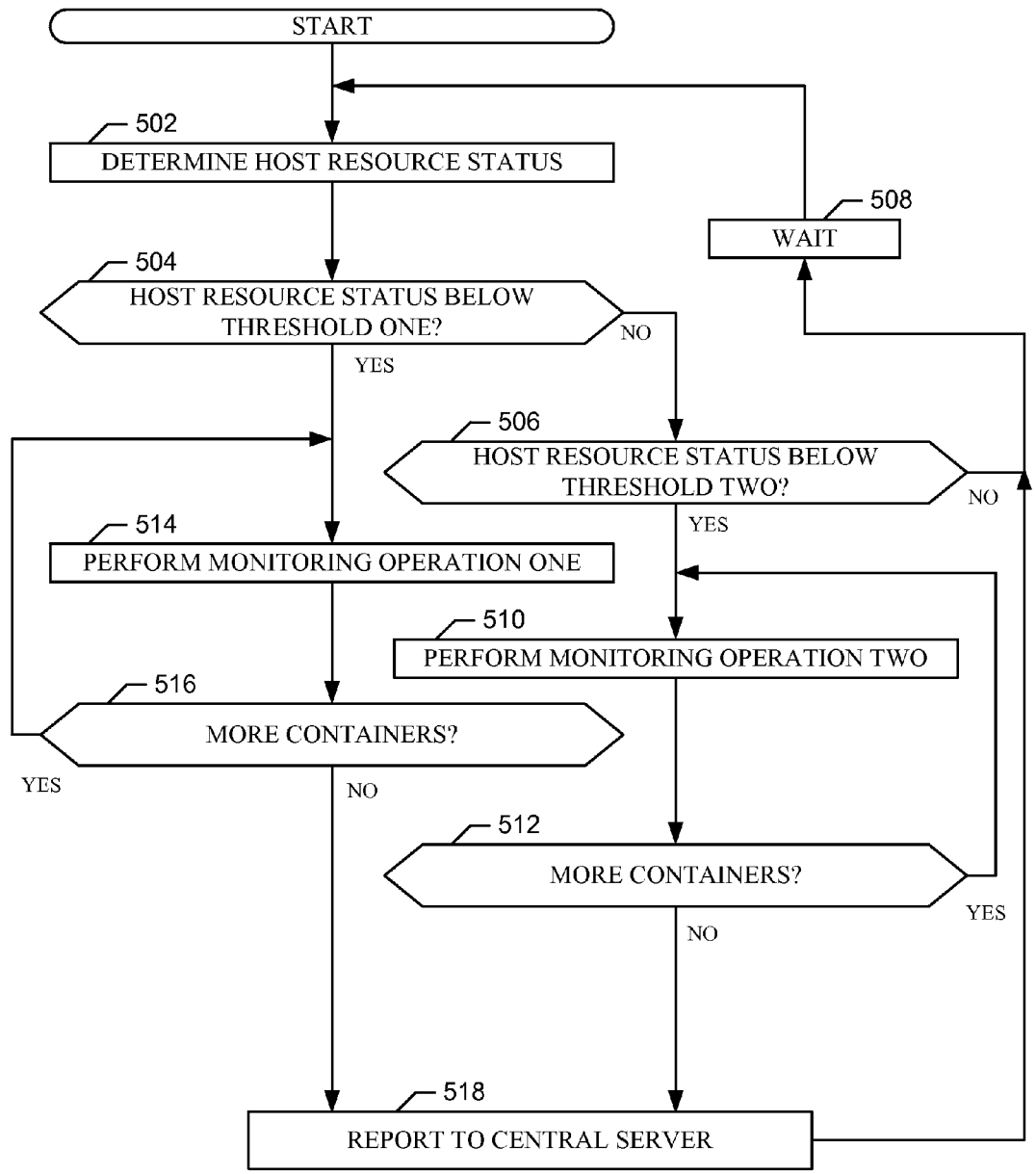

FIG. 5 is a flowchart illustrative of another example program that may be executed to perform monitoring operations instructed by the example monitor 218. The program of FIG. 5 begins when the example host monitor 302 of the example monitor 218 is alerted that a monitoring operation (e.g., a first monitoring operation and/or a second monitoring operation) is to be performed on the example containers 214. For example, the program of FIG. 5 may begin after a time has elapsed since the last monitoring operation has executed, when a user input signals that a monitoring operation is to be performed, in response to detecting an error or a warning condition, etc. When a monitoring operation is to be performed, the example host monitor 302 determines the status of computing resources of the example host computing device 202 (block 502). The status may include any parameters, conditions, and/or other information that may be utilized by the example threshold analyzer 304 to determine if the monitoring operation can, should, and/or will be performed.

Utilizing the status information collected by the example host monitor 302 (block 502), the example threshold analyzer 304 determines if the status information indicates that the host resources are below a first threshold (block 504). The first threshold may be retrieved from the example history datastore 306, may be stored at the threshold analyzer 304, and/or may be retrieved from any other location. While the example of FIG. 5 refers to determining if the resources are below a threshold, the threshold analyzer 304 may determine if a resource meets a threshold, if a resource is below the threshold, etc. According to the illustrated example, the first threshold is greater than a second threshold and the first monitoring operation is more intensive and consumes mores computing resources than the second monitoring operation. Thus, the decision block 504 is satisfied when the information about the resource indicates that there is a sufficient amount of available resource for performing the first monitoring operation (e.g., when the amount of consumed resources is below the first threshold).

When the example threshold analyzer 304 determines that there is not sufficient resources available for performing the first monitoring operation (block 504), the threshold analyzer 304 determines if the status information indicates that the host resources are below a second threshold (block 506). Thus, the decision block 504 is satisfied when the information about the resource indicates that there is a sufficient amount of available resource for performing the second monitoring operation (e.g., when the amount of consumed resources is above the first threshold but is below the second threshold). When the example threshold analyzer 304 determines that there is not sufficient resources available for performing the first monitoring operation or the second monitoring operation (combination of block 504 and block 506), the example threshold analyzer 304 instructs the example container monitor 308 to delay performance of the monitoring operation (block 508). For example, the threshold analyzer 304 and/or the container monitor 308 may start a delay timer, may skip a round of execution of the monitoring operation and await an existing timer to trigger the monitoring operation again, etc. According to the illustrated example, control then returns to block 502 for the example host monitor 302 to again check the status of the example host computing device 202.

When the example threshold analyzer 304 determines that there is sufficient resources available for performing the second monitoring operation (block 506), the example container monitor 308 performs the example second monitoring operation in the example containers 214 (block 510). For example, the container monitor 308 may transmit an instruction to the example container engine 212 to cause the second monitoring operation to be performed in the example containers 214.

After the example container monitor 308 instructs the execution of the second monitoring operation (block 510), the container monitor 308 determines if there are additional ones of the containers 214 to be monitored (block 512). If there are additional ones of the containers 214 to be monitored, control returns to block 510 for the example container monitor 308 to instruct the second monitoring operation for the next one of the containers 214.

Returning to block 504, when the example threshold analyzer 304 determines that there is sufficient resources available for performing the first monitoring operation, the example container monitor 308 performs the example first monitoring operation in the example containers 214 (block 514). For example, the container monitor 308 may transmit an instruction to the example container engine 212 to cause the first monitoring operation to be performed in the example containers 214.

After the example container monitor 308 instructs the execution of the first monitoring operation (block 514), the container monitor 308 determines if there are additional ones of the containers 214 to be monitored (block 516). If there are additional ones of the containers 214 to be monitored, control returns to block 408 for the example container monitor 308 to instruct the first monitoring operation for the next one of the containers 214.

After it is determined in block 512 or block 516 that there are no additional ones of the containers 214 to be monitored, the example container monitor 308 transmits collected monitoring information to the example central server 206 (block 518). The program of FIG. 5 then ends.

Figure 6:
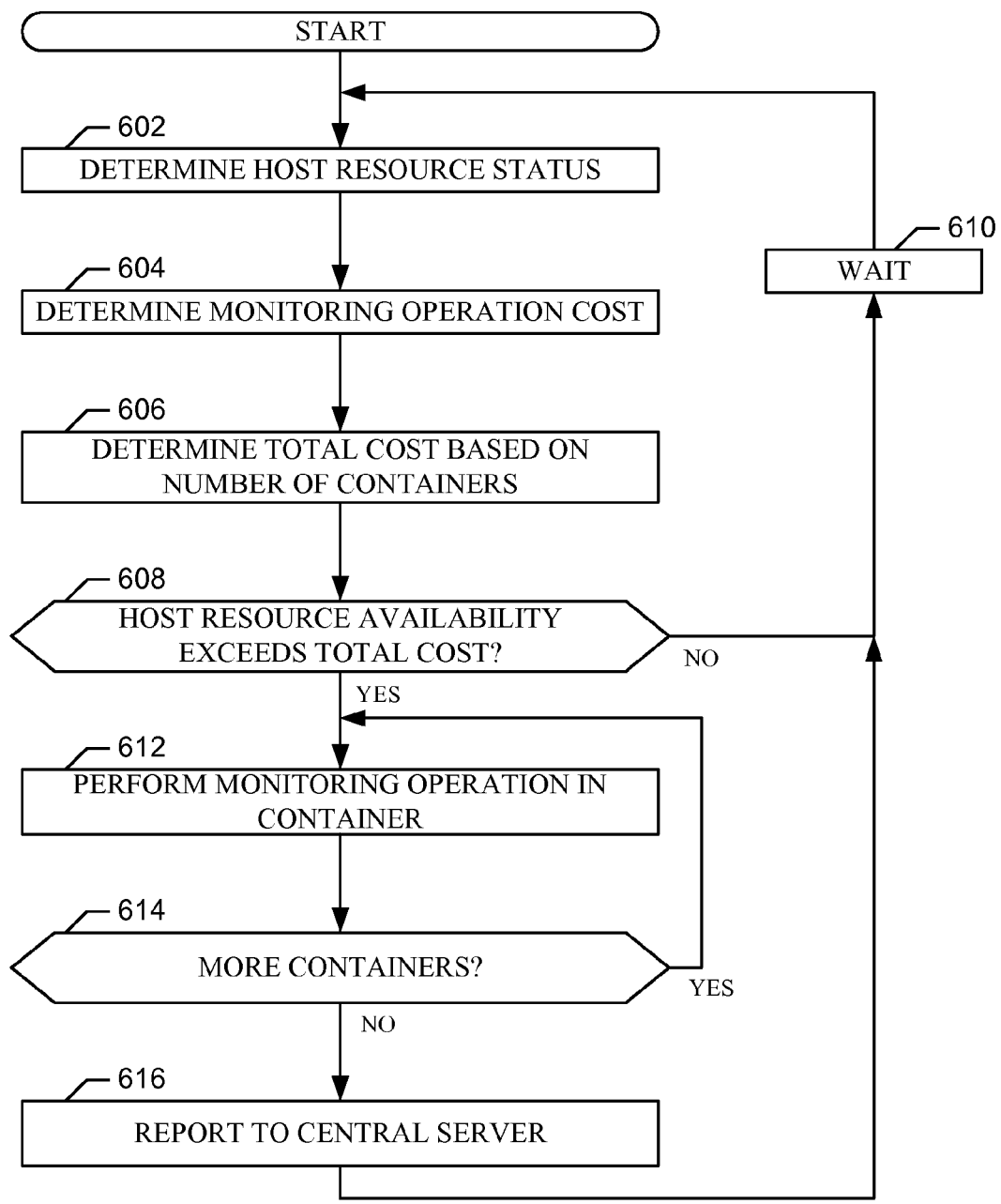

FIG. 6 is a flowchart illustrative of another example program that may be executed to perform monitoring operations instructed by the example monitor 218. The program of FIG. 6 begins when the example host monitor 302 of the example monitor 218 is alerted that a monitoring operation (e.g., a first monitoring operation and/or a second monitoring operation) is to be performed on the example containers 214. For example, the program of FIG. 6 may begin after a time has elapsed since the last monitoring operation has executed, when a user input signals that a monitoring operation is to be performed, in response to detecting an error or a warning condition, etc. When a monitoring operation is to be performed, the example host monitor 302 determines the status of computing resources of the example host computing device 202 (block 602). The status may include any parameters, conditions, and/or other information that may be utilized by the example threshold analyzer 304 to determine if the monitoring operation can, should, and/or will be performed.

The example threshold analyzer 304 then determines a resource cost of performing the intended monitoring operation (block 604). According to the illustrated example, the threshold analyzer 304 retrieves the resource cost from the example history datastore 306 in which the resource cost was previously stored by the monitoring operation analyzer 310. An example program for determining the resource cost by the example monitoring operation analyzer 310 is described in conjunction with FIG. 7.

The example threshold analyzer 304 then determines the total resource cost for executing the monitoring operation on the example containers 214 (block 606). For example, the threshold analyzer 304 may determine a quantity of the containers 214 by querying the example container engine 212 and/or retrieving a previously stored number from the history datastore 306. In such an example, the total resource cost for executing the monitoring operation may be determined by multiplying the monitoring operation cost determined in block 604 by the determined quantity.

Utilizing the status information collected by the example host monitor 302 (block 602) and the total cost for executing the monitoring operation (block 606), the example threshold analyzer 304 determines if the status information indicates that the host resource availability exceeds the total resource cost (block 608). For example, the threshold analyzer 304 may determine if there is sufficient free memory on the host computing device 202 to perform the monitoring operation substantially simultaneously on each of the example containers 214.

When the example threshold analyzer 304 determines that there is not sufficient resources available for performing the monitoring operation (block 608), the threshold analyzer 304 instructs the example container monitor 308 to delay performance of the monitoring operation (block 610). For example, the threshold analyzer 304 and/or the container monitor 308 may start a delay timer, may skip a round of execution of the monitoring operation and await an existing timer to trigger the monitoring operation again, etc. According to the illustrated example, control then returns to block 602 for the example host monitor 302 to again check the status of the example host computing device 202.

When the example threshold analyzer 304 determines that there is sufficient resources available for performing the monitoring operation (block 608), the example container monitor 308 performs the example monitoring operation in the example containers 214 (block 612). For example, the container monitor 308 may transmit an instruction to the example container engine 212 to cause the monitoring operation to be performed in the example containers 214. According to the illustrated example, the example container monitor 308 sends an instruction (or set of instructions) identifying one of the containers 214 that is to be monitored (e.g., may send an instruction identifying a name of each of the containers 214).

After the example container monitor 308 instructs the execution of the monitoring operation (block 612), the container monitor 308 determines if there are additional ones of the containers 214 to be monitored (block 614). If there are additional ones of the containers 214 to be monitored, control returns to block 612 for the example container monitor 308 to instruct the monitoring operation for the next one of the containers 214. If there are no additional ones of the containers 214 to be monitored, the example container monitor 308 transmits collected monitoring information to the example central server 206 (block 616). The program of FIG. 6 then ends.

Figure 7:
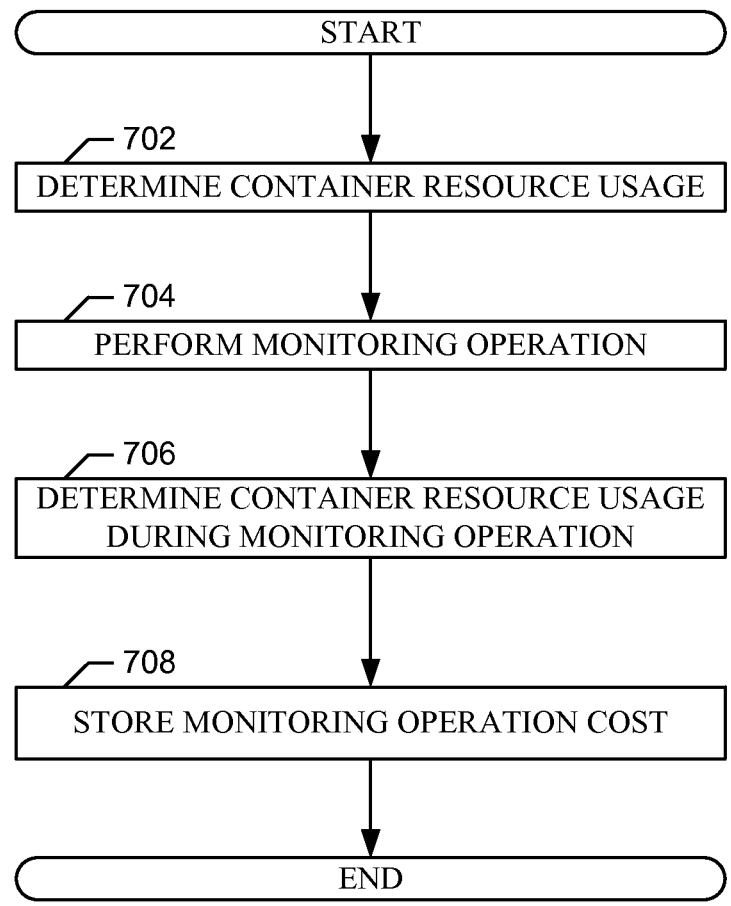

FIG. 7 is a flowchart illustrative of an example program that may be executed to determine a resource cost of a monitoring operation executing in one of the example containers 214. The program of FIG. 7 begins when the example monitoring operation analyzer 310 determines an amount of resources in use by one of the containers 214 (block 702). For example, the example monitoring operation analyzer 310 may remotely execute a command in the container 214 via the example container monitor 308 and the example container engine 212 (e.g., by executing a command utilizing the LXC-Attach command in a system implemented using the LXC container environment, by executing an NSENTER command in a libcontainer environment, etc.).

Block 702 is performed during a time at which a monitoring operation to be analyzed is not being performed (e.g., block 702 may be performed immediately prior to a scheduled monitoring operation is to be performed, may be performed when the monitoring operation analyzer 310 determines that a monitoring operation is not executing, may be performed prior to the scheduling of a monitoring operation for the first time, etc.).

The example container monitor 308 then instructs the execution of the monitoring operation (block 704). For example, the container monitor 308 may instruct the execution of the monitoring operation as described in any of FIGS. 4-6. According to the illustrated example, the execution of the monitoring operation in block 704 is performed to monitor the monitoring operation not as a part of an actual monitoring plan. Alternatively, the execution of the monitoring operation in block 704 may be performed as a part of the monitoring described in conjunction with any of FIGS. 4-6 or any other monitoring method.

While the monitoring operation is executing as a result of container monitor 308 instructing the execution (block 704), the example monitoring operation analyzer 310 determines the resource usage in the example container 214 (block 706). For example, the monitoring operation analyzer 310 may instruct the example container monitor 308 to transmit an instruction to the example container engine 212 to cause execute a command that returns the usage and/or availability of a computing resource in the example container 214.

The example monitoring operation analyzer 310 analyzes the results of blocks 706 and 702 to determine and store the resource cost of the monitoring operation in the example history datastore 306 (block 708). For example, the monitoring operation analyzer 310 may subtract the resource utilization (e.g., memory usage) during the time when the monitoring operation is not being executed (determined in block 702) from the resource utilization (e.g., memory usage) during the time that the monitoring operation is being performed (determine in block 706) to determine the resource utilization of the monitoring operation. The program of FIG. 7 then ends.

While FIG. 7 illustrates an example in which the resource cost is determined based on a single execution of the monitoring operation in one of the example containers 214, the monitoring operation analyzer 310 may alternatively determine the resource cost of the monitoring operation based on multiple executions. For example, the resource costs determined from multiple executions of the monitoring operation may be averaged or otherwise combined to determine an aggregate value to be stored as the resource cost of the monitoring operation. The resource cost determined may be determined periodically (e.g., the calculation may be repeated weekly, monthly, etc.), may be determined aperiodically (e.g., randomly), may be determined each time that a monitoring operation is performed in any of the containers, etc. Furthermore, the resource cost may be determined separately for each of the containers 214 (e.g., where the resource cost is expected to very significantly for different containers (e.g., a virus scan of stored files will take longer and consume more resources on a first container that has more files than a second container)) and a separate resource cost may be analyzed by the example threshold analyzer 304 when determining if a monitoring operation will be performed in each of the containers 214 (e.g., resource cost may be utilized by the threshold analyzer 304 when determining if the monitoring operation is to be performed on a first one of the containers 214 and a second resource cost may be utilized by the threshold analyzer 304 when determined if the monitoring operation is to be performed on a second one of the containers 214).

Figure 8:
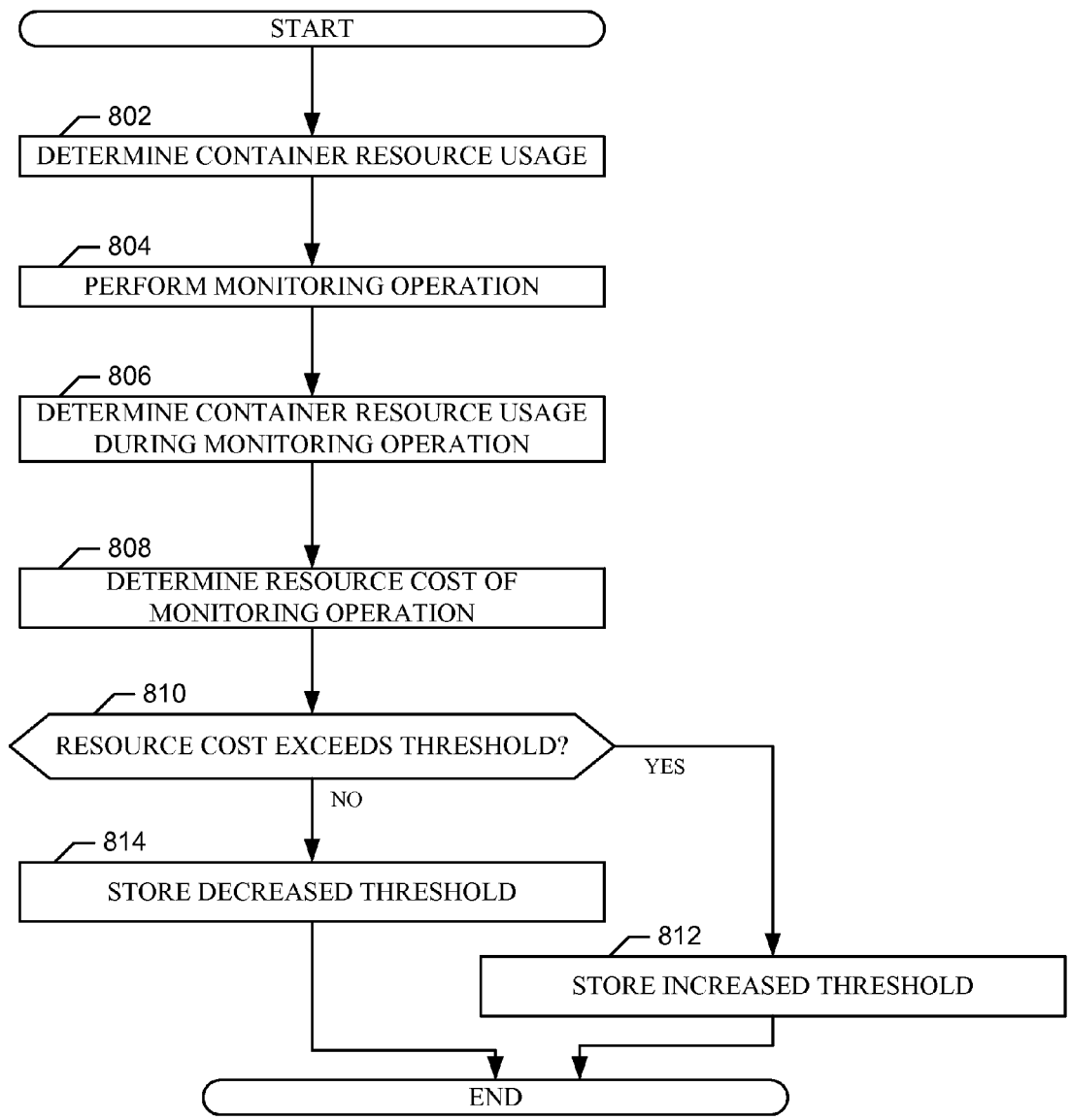

FIG. 8 is a flowchart illustrative of another example program that may be executed to learn and/or update a threshold stored in the example history datastore 306 and utilized by the example threshold analyzer 304. The program of FIG. 8 begins when evaluation of a resource threshold is triggered. For example, the evaluation may be performed periodically, aperiodically, upon a user request, each time that a monitoring operation is to be executed, etc. The example monitoring operation analyzer 310 determines an amount of resources in use by one of the containers 214 (block 802). Block 802 is performed during a time at which a monitoring operation to be analyzed is not being performed (e.g., block 802 may be performed immediately prior to a scheduled monitoring operation is to be performed, may be performed when the monitoring operation analyzer 310 determines that a monitoring operation is not executing, may be performed prior to the scheduling of a monitoring operation for the first time, etc.).

The example container monitor 308 then instructs the execution of the monitoring operation (block 804). For example, the container monitor 308 may instruct the execution of the monitoring operation as described in any of FIGS. 4-6. According to the illustrated example, the execution of the monitoring operation in block 804 is performed to monitor the monitoring operation not as a part of an actual monitoring plan. Alternatively, the execution of the monitoring operation in block 804 may be performed as a part of the monitoring described in conjunction with any of FIGS. 4-6 or any other monitoring method.

While the monitoring operation is executing as a result of container monitor 308 instructing the execution (block 804), the example monitoring operation analyzer 310 determines the resource usage in the example container 214 (block 806). For example, the monitoring operation analyzer 310 may instruct the example container monitor 308 to transmit an instruction to the example container engine 212 to cause execute a command that returns the usage and/or availability of a computing resource in the example container 214.

The example monitoring operation analyzer 312 analyzes the results of blocks 806 and 802 to determine the resource cost of the monitoring operation in the example history datastore 306 (block 808). For example, the monitoring operation analyzer 310 may subtract the resource utilization (e.g., memory usage) during the time when the monitoring operation is not being executed (determined in block 802) from the resource utilization (e.g., memory usage) during the time that the monitoring operation is being performed (determine in block 806) to determine the resource utilization of the monitoring operation.

The example monitoring operation analyzer 310 then determines if the resource cost exceeds the current threshold, stored in the example history datastore 306, for the resource (block 810). For example, where the resource cost is an amount of memory consumed by the execution of the monitoring operation and the threshold is a minimum amount of memory that must be available in order to perform the monitoring operation, the resource cost will exceed the threshold when more memory is required to perform the monitoring operation than was previously anticipated when the threshold was set. When the resource cost exceeds the currently stored threshold, the example monitoring operation analyzer 310 stores an increased threshold (e.g., a threshold that indicates that the monitoring operation should not be performed if the host computing device 202 does not have at least the minimum memory available as specified by the threshold) (block 812). When the resource cost does not exceed the currently stored threshold, the example monitoring operation analyzer 310 stores a decreased threshold (block 814). The example thresholds may be changed to match the resource cost, may be changed by a step amount (e.g., a predetermined amount by which the threshold may be changed during each analysis to prevent significant changes during a single analysis), may be determined based on the resource cost and a constant (e.g., a value that causes the threshold to indicate that more memory is required than is determined by the resource cost to ensure a safety for an instance where the resource cost is greater than expected), etc. The program of FIG. 8 then ends.

Figure 9:
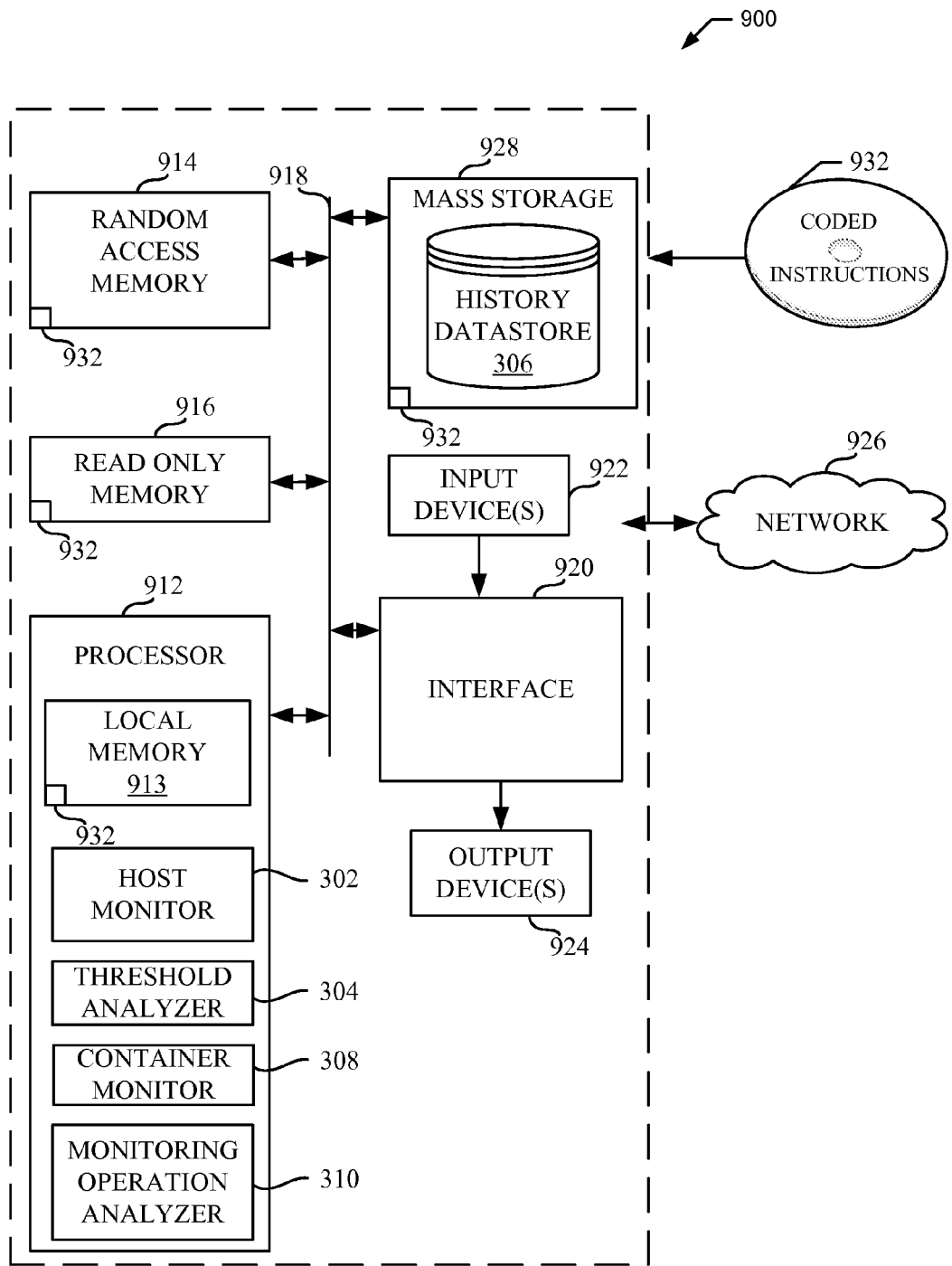
FIG. 9 is a block diagram of an example processor platform structured to execute the example machine-readable instructions of FIGS. 4-8 to implement the example monitor of FIG. 2A, FIGS. 2B, and/or 3.

FIG. 9 is a block diagram of an example processor platform 900 capable of executing the instructions of FIGS. 4-8 to implement the example host monitor 302, the example threshold analyzer 304, the example history datastore 306, the example container monitor 308, and/or the example monitoring operation analyzer 310 of FIG. 3 and/or, more generally, the example monitor 218 of FIG. 2. The processor platform 900 can be, for example, a server, a personal computer, an appliance, a sensor monitor, or any other type of physical device that includes processing circuitry.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The example processor 912 of FIG. 9 may implement the example host monitor 302, the example threshold analyzer 304, the example container monitor 308, and/or the example monitoring operation analyzer 310 of FIG. 3.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The example volatile memory 914 and/or the example mass storage devices 928 of FIG. 9 may implement the example history datastore 306 of FIG. 3.

The coded instructions 932 of FIGS. 11-12 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture facilitate monitoring of virtual objects such as containers and virtual machines. As disclosed herein, the example monitor may be deployed outside of the virtual objects to be monitored (e.g., a single monitor may monitor a plurality of virtual containers while deployed outside of the virtual containers). As such, the disclosed methods, apparatus, and articles of manufacture reduce the amount of computing resource overhead utilized by monitoring by eliminating the need for including a monitoring agent within each virtual object. Furthermore, the example methods, apparatus, and articles of manufacture may further reduce consumption of computing resource by monitoring a status of a host (e.g., a host computing device, a host virtual machine, etc.) to, for example, avoid and/or delay performing monitoring operations when a host computing resources are otherwise in use (e.g., sufficient computing resources are not currently available for performing the monitoring operations).

While the foregoing examples are directed to virtual container environments, the disclosed methods and apparatus may additionally or alternatively be applied to a virtual machine environment or any other type of virtual environment. Such a virtual environment may include a monitor like the example monitor 218 of FIGS. 2A, 2B, and/or 3 (and described in conjunction with FIGS. 4-8) to monitor a host computing device and/or other host components to control monitoring operations performed within the virtualization objects (e.g., virtual machines, containers, etc.). This disclosure is not limited to a particular virtual environment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to monitor containers in computing environments, the method comprising:
  determining, by executing a monitoring agent with a processor, a status of a computing resource of a computing host that is operating a container engine, the monitoring agent executing outside of a first container hosted by the container engine;

comparing, by executing the monitoring agent with the processor, the status to a threshold; and in response to determining that the status meets the threshold, transmitting, by executing the monitoring agent with the processor, a first instruction to the container engine to cause a monitoring operation to be executed within the first container hosted by the container engine to return monitoring information from within the first container to the monitoring agent executing outside of the first container; and transmitting, by executing the monitoring agent with the processor, a second instruction to the container engine to cause the container engine to execute the monitoring operation in a second container.

2. A method as defined in claim 1, wherein the computing host is at least one of a computing device or a virtual machine.

3. A method as defined in claim 1, wherein the instruction includes at least one of LXC-ATTACH or NSENTER.

4. A method as defined in claim 1, wherein the status is indicative of at least one of an amount of physical computing resources available on the computing host or an amount of physical computing resources utilized at the computing host.

5. A method as defined in claim 1, wherein the status includes at least one of a status of a processing resource, a status of a memory resource, a status of a storage resource, and a status of a network resource.

6. A method to monitor containers in computing environments, the method comprising:

determining, by executing a monitoring agent with a processor, a status of a computing resource of a computing host that is operating a container engine, the monitoring agent executing outside of a container hosted by the container engine;

comparing, by executing the monitoring agent with the processor, the status to a threshold;

in response to determining that the status meets the threshold, causing, by executing the monitoring agent with the processor, a monitoring operation to be executed within the container hosted by the container engine to return monitoring information from within the container to the monitoring agent executing outside of the container;

monitoring the execution of the monitoring operation to determine an amount of the computing resource consumed by the execution; and modifying the threshold based on the amount of the computing resource consumed by the execution.

7. A method as defined in claim 1, wherein the execution of the monitoring operation does not utilize a non-native monitoring agent installed in the first container.

8. A method as defined in claim 1, wherein the threshold is determined based on an average of an amount of the computing resource utilized during a plurality of executions of the monitoring operation.

9. A method as defined in claim 1, wherein the container engine isolates a first application executing in an environment of an operating system hosting the container engine to isolate the first application from a second application executing in the environment.

10. An apparatus to monitor containers in a computing environment, the apparatus comprising:

a processor;

a host monitor to determine a status of a computing resource of a computing host that is operating a container engine;

a threshold analyzer to compare the status to a threshold; and a container monitor to:

in response to the threshold analyzer determining that the status meets the threshold, transmit a first instruction to the container engine to cause a first container hosted by the container engine to execute a monitoring operation within the first container to return monitoring information from within the first container to the container monitor, the container monitor executing outside of the first container, and transmit a second instruction to the container engine to cause the container engine to execute the monitoring operation in a second container, wherein at least one of the host monitor, the threshold analyzer, or the container monitor is implemented on the processor.

11. An apparatus as defined in claim 10, wherein the computing host is at least one of a computing device or a virtual machine.

12. An apparatus as defined in claim 10, wherein the instruction includes at least one of LXC-ATTACH or NSENTER.

13. An apparatus as defined in claim 10, wherein the status represents at least one of an amount of physical computing resources available on the computing host or an amount of physical computing resources of the computing host that are being utilized.

14. An apparatus as defined in claim 10, wherein the status includes at least one of a status of a processing resource, a status of a memory resource, a status of a storage resource, and a status of a network resource.

15. An apparatus to monitor containers in a computing environment, the apparatus comprising:

a processor;

a host monitor to determine a status of a computing resource of a computing host that is operating a container engine;

a threshold analyzer to compare the status to a threshold; and a container monitor to, in response to the threshold analyzer determining that the status meets the threshold, cause a container hosted by the container engine to execute a monitoring operation within the container to return monitoring information from within the container to the container monitor, the container monitor executing outside of the container; and a monitoring operation analyzer to:

monitor the execution of the monitoring operation to determine an amount of the computing resource consumed by the execution; and modify the threshold based on the amount of the computing resource consumed by the execution, wherein at least one of the host monitor, the threshold analyzer, the container monitor, or the monitoring operation analyzer is implemented on the processor.

16. A tangible computer readable storage medium comprising instructions that, when executed, cause a machine to execute a monitoring agent to at least:

determine a status of a computing resource of a computing host that is operating a container engine, the monitoring agent executing outside of a first container hosted by the container engine;

compare the status to a threshold;

in response to determining that the status meets the threshold, transmit a first instruction to the container engine to cause a monitoring operation to be executed within the first container hosted by the container engine to return monitoring information from within the first container to the monitoring agent executing outside of the first container; and transmit a second instruction to the container engine to cause the container engine to execute the monitoring operation in a second container.

17. A tangible computer readable storage medium as defined in claim 16, wherein the computing host is at least one of a computing device or a virtual machine.

18. A tangible computer readable storage medium as defined in claim 16, wherein the instructions, when executed, further cause the machine to transmit a monitoring instruction to the container engine to cause the container engine to execute the monitoring operation in the first container.

19. A tangible computer readable storage medium comprising instructions that, when executed, cause a machine to execute a monitoring agent to at least:

determine a status of a computing resource of a computing host that is operating a container engine, the monitoring agent executing outside of a container hosted by the container engine;

compare the status to a threshold;

in response to determining that the status meets the threshold, cause a monitoring operation to be executed within the container hosted by the container engine to return monitoring information from within the container to the monitoring agent executing outside of the container;

monitor the execution of the monitoring operation to determine an amount of the computing resource consumed by the execution; and modify the threshold based on the amount of the computing resource consumed by the execution.

* * * * *